United States Patent [19]

Van Rosmalen

[11] Patent Number: 5,612,945
[45] Date of Patent: Mar. 18, 1997

[54] DEVICE FOR RECORDING AND/OR READING INFORMATION BY MEANS OF A RADIATION BEAM, PLATE-SHAPED ELEMENT SUITABLE FOR USE IN THE DEVICE, AND DISC PLAYER COMPRISING THE DEVICE

[75] Inventor: Gerard E. Van Rosmalen, Eindhoven, Netherlands

[73] Assignee: U.S. Philips Corporation, New York, N.Y.

[21] Appl. No.: 186,399

[22] Filed: Jan. 25, 1994

[30] Foreign Application Priority Data

Feb. 22, 1993 [EP] European Pat. Off. .............. 93200495

[51] Int. Cl.⁶ .................................................. G11B 7/08
[52] U.S. Cl. ........................ 369/247; 369/215; 369/244
[58] Field of Search ................................ 369/213, 215, 369/219, 220, 221, 44.11, 44.14, 44.15, 44.16, 44.22, 244, 247, 248, 249, 263

[56] References Cited

U.S. PATENT DOCUMENTS

| | | |
|---|---|---|
| 3,656,015 | 4/1972 | Gillum ............................ 310/13 |
| 4,147,364 | 4/1979 | Nakatsuka ...................... 369/247 |
| 4,602,175 | 7/1986 | Castagna ......................... 310/13 |
| 4,778,028 | 10/1988 | Staley ............................. 181/208 |
| 4,823,219 | 4/1989 | Ueda et al. ..................... 360/106 |
| 4,922,477 | 5/1990 | Miura ............................. 369/221 |
| 4,967,293 | 10/1990 | Aruga et al. ................. 369/247 X |
| 5,214,630 | 5/1993 | Goto et al. .................... 369/44.14 |

FOREIGN PATENT DOCUMENTS

| | | |
|---|---|---|
| 0397262 | 11/1990 | European Pat. Off. . |
| 0473425 | 3/1992 | European Pat. Off. . |
| 3315848 | 10/1984 | Germany . |
| 57-82205 | 5/1982 | Japan ............................. 369/292 |
| 4178923 | 6/1992 | Japan ............................. 369/247 |

*Primary Examiner*—Stuart S. Levy
*Assistant Examiner*—William J. Kilmowicz
*Attorney, Agent, or Firm*—Arthur G. Schaier

[57] ABSTRACT

An optical scanner for a disc placed on a turntable, having a scanning device mounted on a slide which is movable radially with respect to the turntable. The slide includes a body made of two thin plates which are parallel to each other and the direction of movement. The plates have patterns of raised portions which face each other. The plates are fixed to each other at locations where the raised portions contact each other.

19 Claims, 4 Drawing Sheets

DEVICE FOR RECORDING AND/OR READING INFORMATION BY MEANS OF A RADIATION BEAM, PLATE-SHAPED ELEMENT SUITABLE FOR USE IN THE DEVICE, AND DISC PLAYER COMPRISING THE DEVICE

BACKGROUND OF THE INVENTION

The invention relates to a device for inscribing and/or reading information by means of a radiation beam, which device comprises a frame, a turntable for supporting a disc-shaped information carrier, which turntable is supported by the frame, and a drive unit for rotating the turntable about an axis of rotation, a slide which is movable in an at least substantially radial direction relative to the axis of rotation and a drive arrangement fix the slide, the slide having a slide body to which a scanning device is secured, which scanning device comprises an objective lens for focusing the radiation beam onto a surface of the information carrier.

Such a device is known from EP-A 0,473,425. Said European Patent Application discloses an optical player with a slide which is movable along guide spindles of a magnetically permeable material and which carries an objective lens and an actuator for moving the objective lens in a focusing direction. The guide spindles are secured to a frame, which also carries a turntable for supporting an optical disc. The slide, which is movable in a radial direction relative to the turntable, is coupled to a drive arrangement comprising a magnetic yoke, which includes the guide spindles, with a permanent magnet and two cylindrical drive coils, which are secured to the slide and which surround the guide spindles. The slide comprises two supporting units carrying rollers for cooperation with the guide spindles, and a pick-up body secured to the supporting units and carrying the drive coils and the actuator. The known slide is of comparatively intricate construction, is comparatively heavy, and is comparatively bulky, particularly its dimension in the focusing direction being large. Moreover, the known slide has the problem, as is known per se, that energization of the cylindrical drive coils gives rise to a comparatively large self-induction, which counteracts rapid variations in current strength in the drive coils.

For the design of modem optical players generally have to comply with stringent requirements as regards a small overall height and a short access time. The known device cannot meet these requirements.

SUMMARY OF THE INVENTION

It is an object of the invention to improve the device of the type defined in the opening paragraph so as to obtain a slim light-weight device by means of which short access times are attainable.

To this end the device in accordance with the invention is characterized in that the slide body is an element made up of two parallel plate-shaped parts, each of the parts having a side facing the other part and provided with a pattern of raised portions, raised portions of the one part being affixed to raised portions of the other part. Owing to this construction the slide used in the device in accordance with the invention is not only flat and light in weight but it also has a high torsional as well as flexural stiffness. As is also the case in the known device, the slide forms pan of a radial tracking system for following an information track in the information career during recording and/or reading. Moreover, as is in the known device, the device in accordance with the invention comprises a focus control system for focusing the radiation beam to a radiation spot on an information surface of the information carrier. It has been found that in spite of the plate-shaped slide body the slide of the device in accordance with the invention has natural frequencies whose values lie substantially outside the control ranges of the tracking system and the focus control system, so that annoying resonances during scanning of the optical information carrier are minimized.

An embodiment of the device in accordance with the invention is characterized in that said raised portions of each of the plate-shaped pans take the form of fibs. It has been found that high torsional and flexural stillnesses are attainable by providing both plate-shaped pans with a fib structure. Improved stillnesses with the same low mass of the slide body are obtained if the ribs intersect each other.

An embodiment of the device in accordance with the invention is characterized in that said raised portions of each of the plate-shaped parts form a honeycomb structure. Such a structure results in optimum torsional and flexural stiffnesses.

An embodiment of the device in accordance with the invention is characterized in that the pattern of raised portions on one side is the mirror image of the pattern of raised portions on the other side. In this way the structures of the two plate-shaped parts are exactly in register, so that an optimum use is made of the properties of the structures.

An embodiment of the device in accordance with the invention is characterized in that the two plate-shaped parts have an equal thickness. In the present embodiment forces exerted on the slide body are divided equally between the two parts.

An embodiment of the device in accordance with the invention is characterized in that a damping material is situated between raised portions of the one part and raised portions of the other past. An advantage of this embodiment is that resonances of the slide body which are generated in operation are damped, so that resonances which could affect the tracking system and/or the focus control system are suppressed at the earliest possible stage.

An embodiment of the device in accordance with the invention is characterized in that the damping material is an adhesive. In this way it is possible to secure the parts to one another during manufacture and to achieve damping during use by means of the same material, for example a damping polyacrylate resin.

An embodiment of the device in accordance with the invention is characterized in that the damping material is rubber. It has been found that shear forces occurring in the damping material during damping can be absorbed very effectively by a synthetic rubber, such as butyl rubber or silicone rubber.

An embodiment of the device in accordance with the invention is characterized in that the drive arrangement for the slide comprises a flat drive coil secured to the slide body and having a coil axis oriented transversely of the plate-shaped slide body, the slide body and the drive coil being coplanar, and at least one flat permanent magnet for cooperation with the drive coil, which magnet is arranged opposite the drive coil and is secured to a yoke of a soft-magnetic material, which yoke is at least partly plate-shaped and is oriented transversely of the coil axis. The drive arrangement used has a small coefficient of self-induction, permitting a rapid increase of an electric current through the drive coil. Moreover, the flat drive coil, which cooperates with the magnet via an air gap, has a satisfactory dissipation of heat to the surrounding air, so that the slide can perform a large number of movements per unit of time. Consequently, the present drive arrangement enables short access times to be attained. A further advantage of the drive arrangement is that its overall height can be small.

An embodiment of the device in accordance with the invention is characterized in that the plate-shaped yoke is secured to the frame by resilient and damping means capable of elastic deflection and of damping in an at least substantially radial direction relative to the axis of rotation of the turntable. This step prevents large reactive forces, which are produced during high accelerations of the slide, from being transmitted to the frame, in order to preclude unnecessary loading of the control systems used.

An embodiment of the device in accordance with the invention is characterized in that said means comprise at least one resilient element and at least one damping element.

The invention further relates to a plate-shaped element suitable, inter alia, for use in a device in accordance with the invention. The plate-shaped element in accordance with the invention comprises two parallel plate-shaped parts, each of the parts having a side facing the other pan and provided with a pattern of raised portions, the pattern of raised portions on one side being affixed to the pattern of raised portions on the other side. In order to prevent annoying resonances during use of the plate-shaped element the plate-shaped element is preferably characterized in that a damping material is situated between the pattern of raised portions on the one side and the pattern of raised portions on the other side. For reasons of production engineering the plate-shaped parts are preferably injection-moulded products and are preferably made from a plastics, such as a liquid-crystal polymer, or aluminium or magnesium, in order to achieve a large stiffness to mass ratio.

The invention also relates to a disc player comprising a housing and a device in accordance with the invention.

The invention will now be described in more detail, by way of example, with reference to the drawings:

DESCRIPTION OF THE PREFERRED EMBODIMENT

Figure 1:
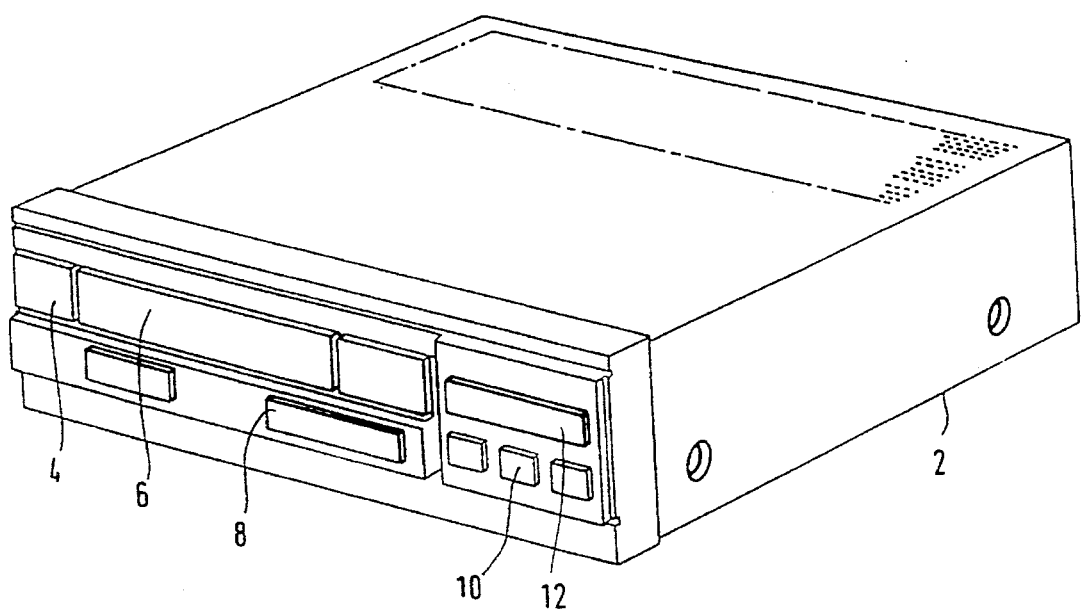
FIG. 1 is a perspective view of an embodiment of the disc player in accordance with the invention.

The optical player in accordance with the invention shown in FIG. 1 comprises a housing 2 with a front 4 having a front opening in which is drawer 6 is situated. The drawer 6 forms part of a loading device which is not described in more detail herein. A suitable loading device is disclosed in, for example, EP-A 0,397,262 to which U.S. Pat. No. 5,187,701 corresponds (herewith incorporated by reference). The front 4 further carries control keys 8, program keys 10, and a display 12. The housing 2 accommodates a device in accordance with the invention and a laser source. Depending on the provisions with which it is equipped the player shown can be used for optically reading an optical disc, for example a CD or CD-ROM, or for magneto-optically inscribing and/or optically reading a magneto-optical disc, such as a 3½" MO disc.

Figure 2:
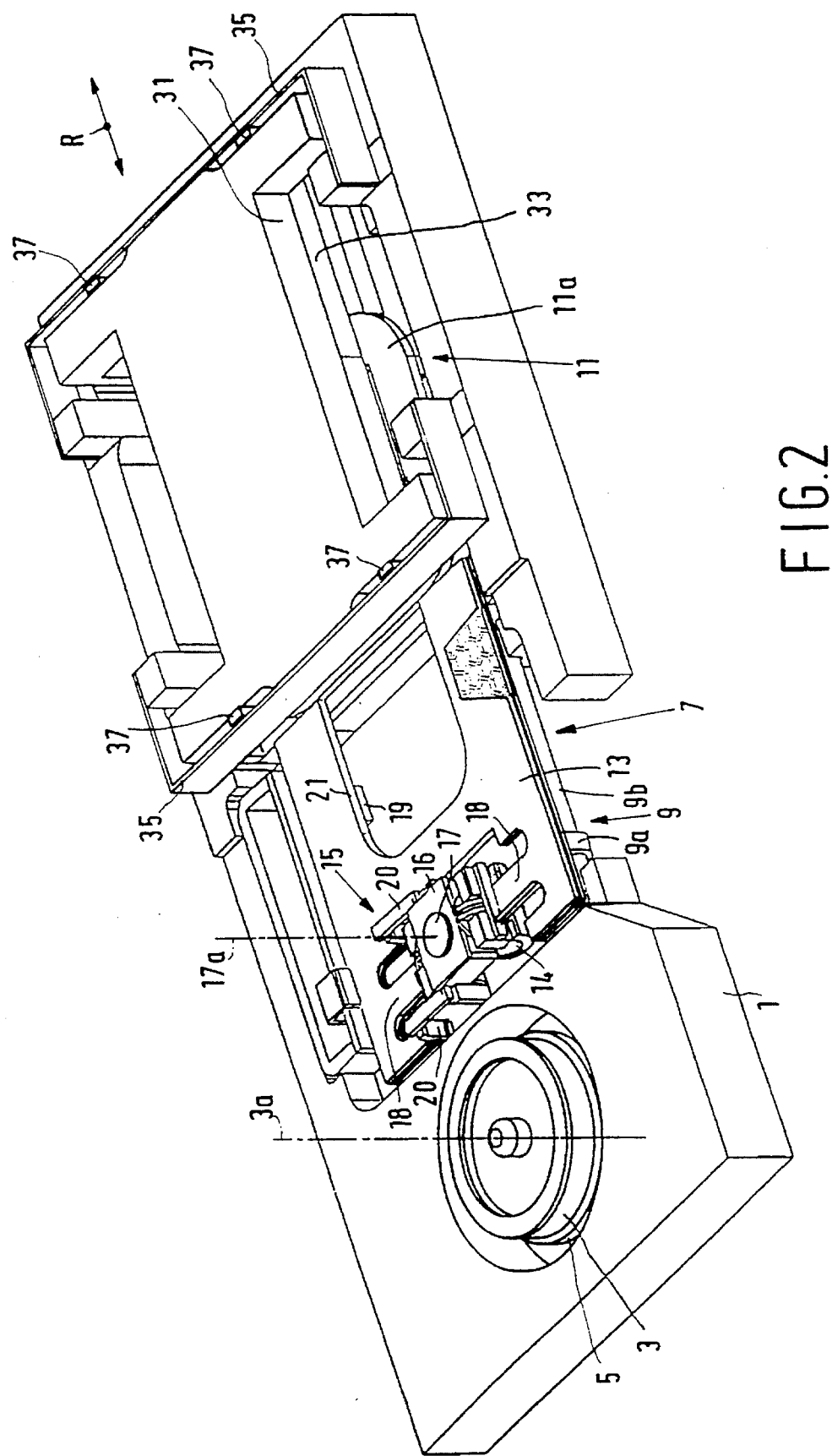
FIG. 2 is a perspective view of an embodiment of the device in accordance with the invention.
Figure 3:
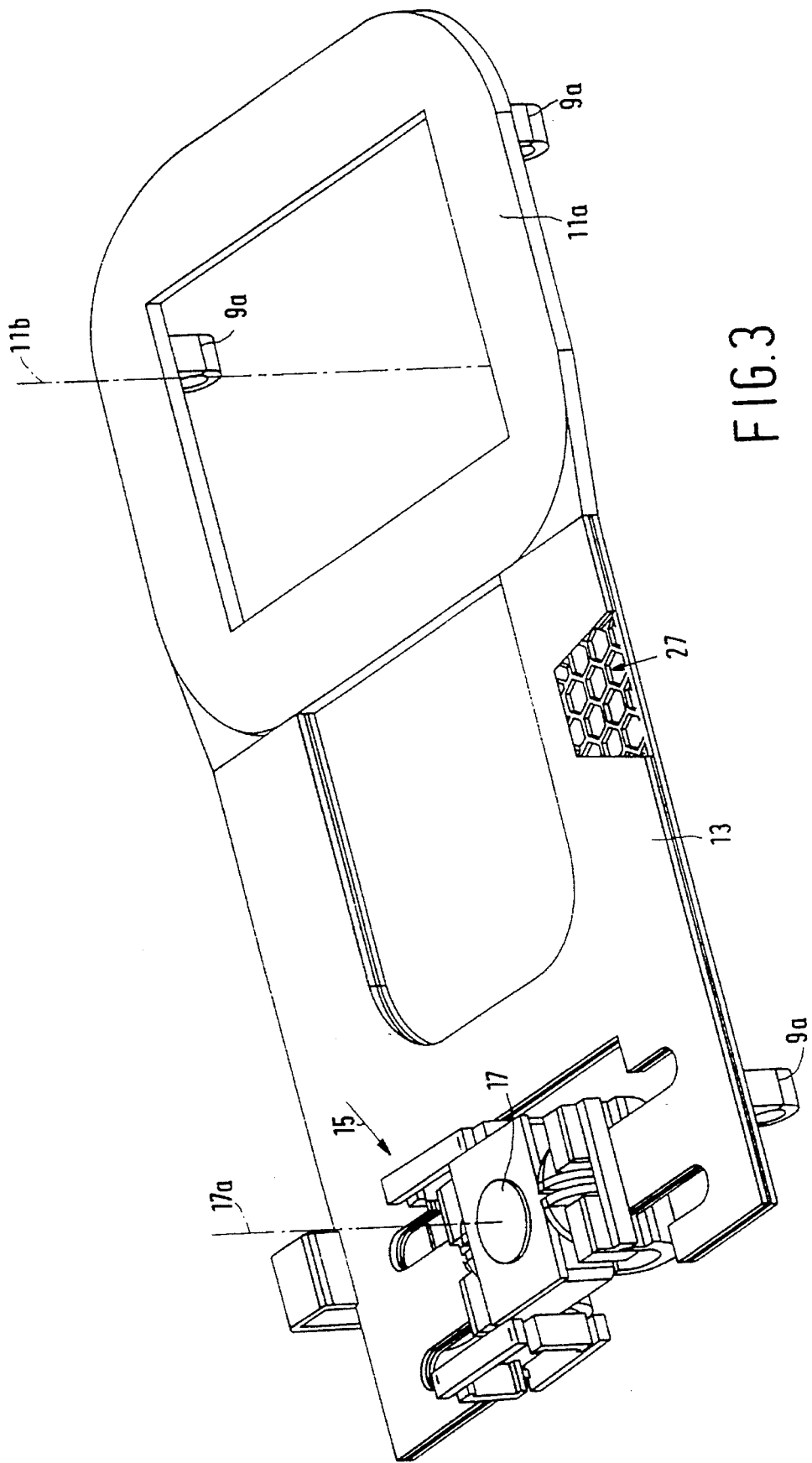
FIG. 3 shows a slide of the device shown in FIG. 2.
Figure 4:
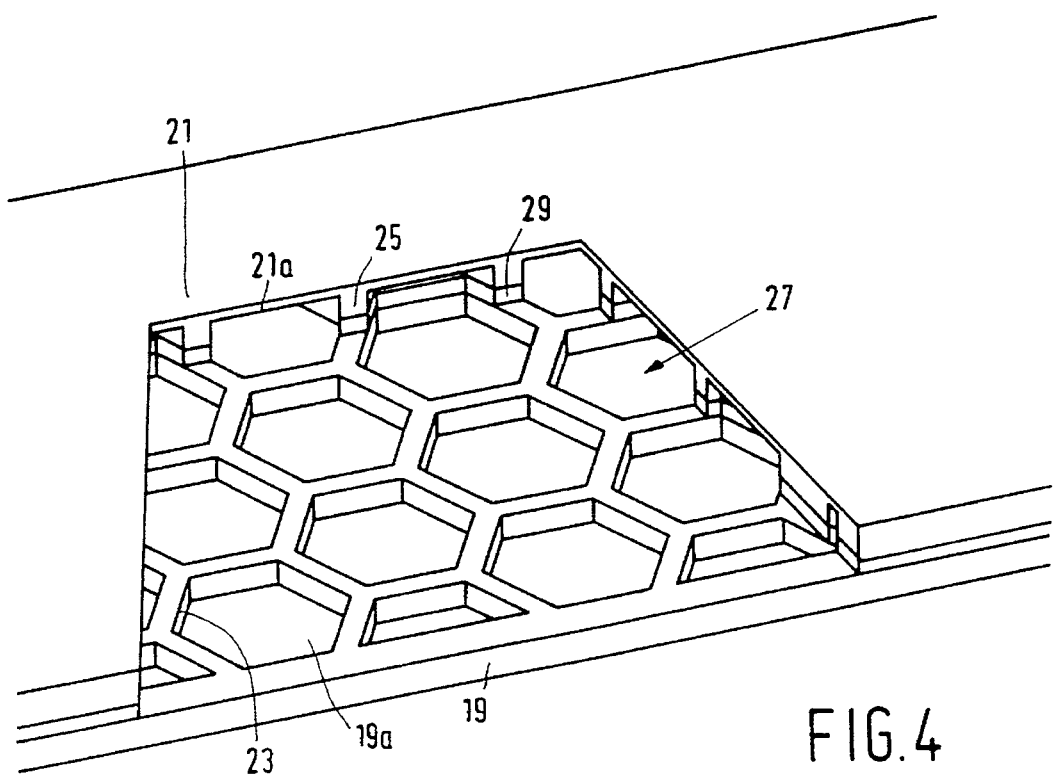
FIG. 4 shows a part of a slide body of the slide shown in FIG. 3.

The device in accordance with the invention shown in FIGS. 2 to 4 comprises a slide 7 with a slide body 13 and a frame 1 for supporting the slide 7. The frame 1 carries a turntable 3 which is rotatable about an axis of rotation 3a. In operation the turntable 3, which is adapted to support disc-shaped information carriers, particularly optical or magneto-optical discs, in a centered fashion, is driven by an electrical drive unit 5. The slide 7 is movable in a radial direction R relative to the turntable 3. For this purpose the device has rectilinear guide means 9 comprising four bearings 9a, for example sleeve bearings, and two parallel guide spindles 9b secured to the frame 1 and engaging the bearings.

The device in accordance with the invention further comprises a drive arrangement 11 for the slide 7. This drive arrangement comprises a flat drive coil 11a secured to the slide 7 and a flat permanent magnet 33 facing the drive coil 11a. The magnet 33, which cooperates with the drive coil 11a via an air gap when the drive coil 11a is energized, comprises a pair of magnet poles of mutually opposite polarity which face the drive coil, and is secured to a plate-shaped part of a yoke 31. The yoke 31 is made of a soft-magnetic material and is secured to the frame 1 via elements 35 which can deflect elastically in the radial direction R and in the present example comprise two resilient members secured to the frame 1. Damping elements 37, which in the present example comprise rubber pads, are interposed between the members and the yoke.

The slide 7 carries a scanning device 15 comprising an objective lens 17 for focusing a radiation beam onto the surface of an information carrier lying on the turntable and rotated together with the turntable. The objective lens 17 has an optical axis 17a which extends parallel to the axis of rotation 3a. The scanning device 15 comprises a stationary section 14 and a section 16 which is movable relative to said stationary section and which carries the objective lens 17. The stationary section 14 is secured to part 18 of the slide body 13 and the movable section 16 is secured to the slide 7 via resilient suspension frames 20. The suspension frames allow limited movements of the movable section 16 in focusing directions, i.e. movements along the optical axis 17a, and in the radial direction R. The scanning device comprises electromagnetic drive means for driving the movable section 16. The scanning device used in the present example is described in the European Patent Application filed under number 92203983.9 co-pending U.S. patent application Ser. No. 08/165,057 assigned to the assignee of the instant application, herewith incorporated by reference).

The slide body 13 of the slide 7 of the device in accordance with the invention is an element formed by two plate-shaped parts 19 and 21 secured to one another. In the example shown in FIGS. 2 to 4 the parts 19 and 21 are injection-moulded products moulded from a liquid-crystal polymer. At the sides 19a and 21a which face each other the plate-shaped pans 19 and 21 have identical honeycomb structures 27, the raised portions or ribs 23 of the one structure being exactly in register with the raise portions or ribs 25 of the other structure. An adhesive layer and a thin layer of a damping material, for example butyl rubber, are situated between the ribs 23 and 25.

Figure 5:
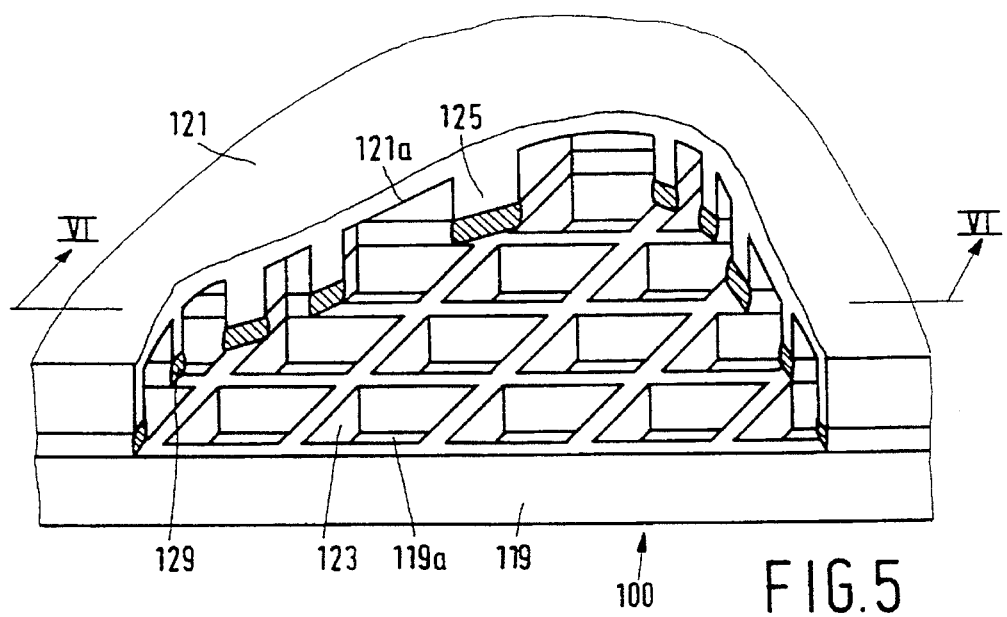
FIG. 5 shows a part of an embodiment of a composite plate-shaped element in accordance with the invention.
Figure 6:
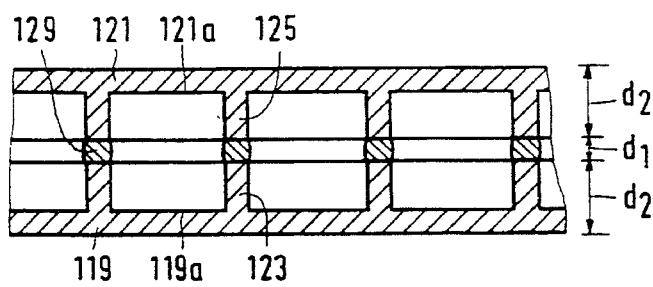
FIG. 6 shows a part in sectional view taken on the line VI—VI in FIG. 5.

The element 100 in accordance with the invention shown in FIGS. 5 and 6 is made up of two parallel plate-shaped parts 119 and 121. Each of the parts 119 and 121 has a side 119a and 121a, respectively, which faces the other part and which has been provided with a pattern of raised portions, particularly ribs 123 and 125, respectively. The intersecting ribs 123 of the one part 119 are secured to the intersecting ribs 125 of the other part 121. The pattern of ribs 123 on the one side 119a is affixed to mirror-inverted pattern of ribs 125 on the other side. This is effected, for example, by applying a thin layer 129 of polyacrylate resin having a thickness d1 of preferably less than 0.3 mm. The parts 119 and 121, which in the present example, are made of aluminium, have an equal thickness d2 of, in the present example, 1.0 mm.

I claim:

1. A device for scanning a disc-shaped information carrier with a radiation beam, comprising:

a frame, a turntable mounted for rotation with respect to the frame, and a drive unit for rotating the turntable about an axis of rotation, a scanning device for focusing the beam of radiation onto a surface of the information carrier, a slide, including a slide body to which the scanning device is secured, mounted for movement with respect to the frame and turntable in a direction which is substantially radial with respect to the axis of rotation, and a drive arrangement for moving the slide in said direction, comprising a first drive element forming part of the slide and a second drive element connected to the frame, wherein the scanning device and the first drive element are spaced from each other in said direction, and the slide body is formed from two plate-shaped parts which are parallel to each other and to the information carrier, and which extend in said direction between and interconnecting the first drive element and the scanning device, each of the plate-shaped parts having a pattern of raised portions on a side facing the other plate-shaped part, raised portions of one of the parts contacting raised portions of the other part at a plurality of locations and being affixed to the raised portions of the other part at the plurality of locations wherein the first drive element is affixed to one distal end of the slide body and the scanning device is affixed to an opposite, proximal end thereof with the entirety of the plate shaped parts interposed between the distal and proximal ends for providing stiffening and dampening means.

2. A device as claimed in claim 1, wherein said raised portions are ribs.

3. A device as claimed in claim 1, wherein the raised portions on one of said parts are ribs arranged in a pattern, and the ribs intersect each other, and the raised portions on the other of said parts are ribs arranged to intersect each other.

4. A device as claimed in claim 1, wherein said raised portions of each of said parts form a honeycomb structure.

5. A device as claimed in claim 1, wherein the raised portions on said parts are arranged as mirror image patterns.

6. A device as claimed in claim 1, wherein said parts have an equal thickness.

7. A device as claimed in claim 1, wherein the raised portions contact each other through a damping material disposed therebetween.

8. A device as claimed in claim 7, wherein the damping material is an adhesive.

9. A device as claimed in claim 7, wherein the damping material is rubber.

10. A device for scanning a disc-shaped information carrier with a radiation beam, comprising:

a frame, a turntable mounted for rotation with respect to the frame, and a drive unit for rotating the turntable about an axis of rotation, a scanning device for focusing the beam of radiation onto a surface of the information carrier, a slide, including a slide body to which the scanning device is secured, mounted for movement with respect to the frame and turntable in a direction which is substantially radial with respect to the axis of rotation, and a drive arrangement for moving the slide in said direction, comprising a first drive element forming part of the slide and a second drive element connected to the frame, wherein the scanning device and the first drive element are spaced from each other in said direction, the first drive element is a flat drive coil having a coil axis oriented parallel to the axis of rotation, the second drive element comprises at least one flat permanent magnet arranged opposite the drive coil and a yoke of soft magnetic material, the yoke being at least partly plate-shaped and oriented transversely to the coil axis, and the slide body is formed from two plate-shaped parts which are parallel to each other and to the information carrier, and which extend in said direction between and interconnecting the flat drive coil and the scanning device, each of the plate-shaped parts having a pattern of raised portions on a side facing the other plate-shaped part, raised portions of one of the parts contacting raised portions of the other part at a plurality of locations and being affixed to the raised portions of the other part at the plurality of locations wherein the first drive element is affixed to one distal end of the slide body and the scanning device is affixed to an opposite, proximal end thereof with the entirety of the plate shaped parts interposed between the distal and proximal ends for providing stiffening and dampening means.

11. A device as claimed in claim 10, wherein the plate-shaped yoke is secured to the frame by a resilient damping element, capable of elastic deflection and of damping in said direction.

12. A device as claimed in claim 10, wherein said parts are injection-molded products.

13. A device as claimed in claim 10, wherein said parts are injection-molded from a plastic material.

14. A device as claimed in claim 10, wherein said parts are injection-molded from one of the metals aluminum or magnesium.

15. A device as claimed in claim 10, wherein said raised portions are ribs.

16. A device as claimed in claim 10, wherein the raised portions on one of said parts are ribs arranged in a pattern, and the ribs intersect each other, and the raised portions on the other of said parts are ribs arranged to intersect each other.

17. A device as claimed in claim 10, wherein the raised portions contact each other through a damping material disposed therebetween.

18. A device as claimed in claim 17, wherein the damping material is an adhesive.

19. A device as claimed in claim 17, wherein the damping material is rubber.

* * * * *